Oct. 5, 1926.
F. BEVERLY
1,602,097
POWER OPERATED SAW
Original Filed Feb. 7, 1925    2 Sheets-Sheet 1
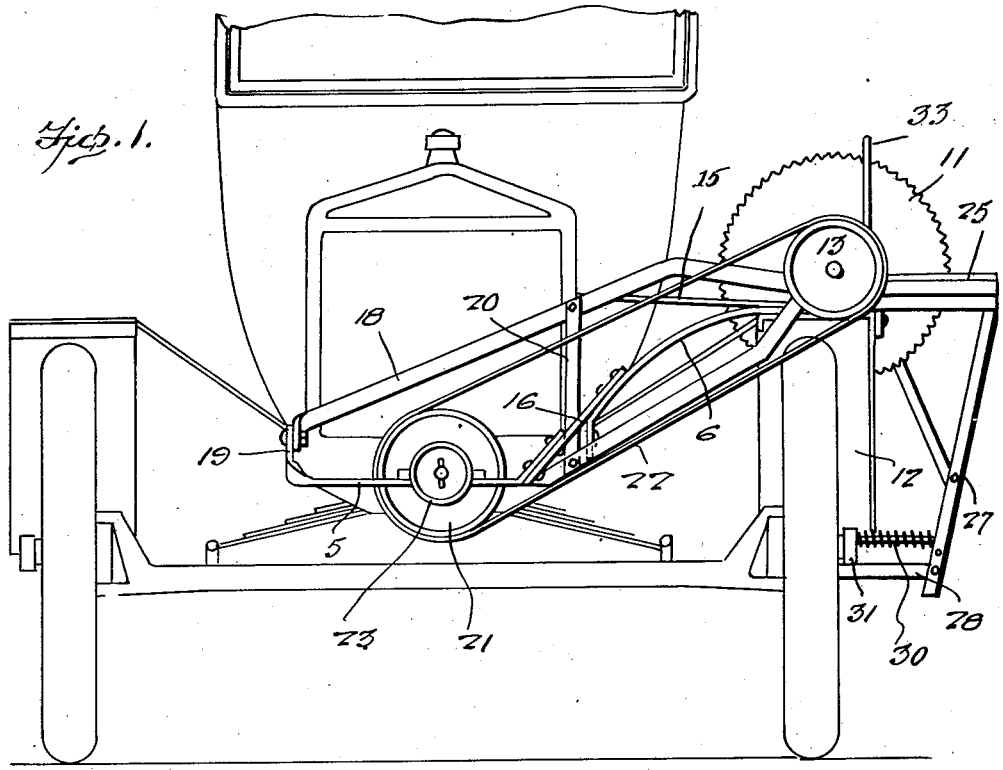
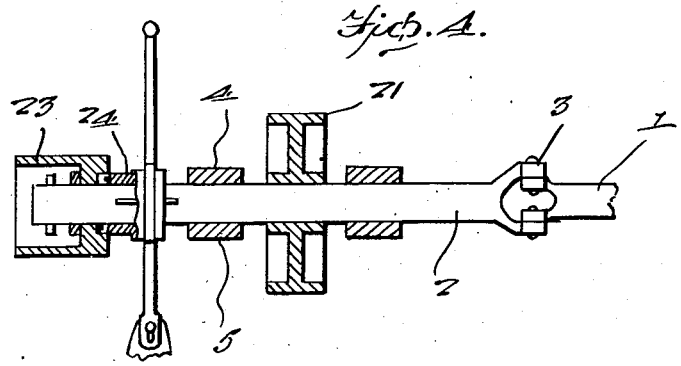
Inventor
Frank Beverly
By Clarence O. Swain
Attorney Oct. 5, 1926.  1,602,097
F. BEVERLY
POWER OPERATED SAW
Original Filed Feb. 7, 1925   2 Sheets-Sheet 2

Inventor
Frank Beverly
By Clarence O'Brien
Attorney

Patented Oct. 5, 1926.

1,602,097

UNITED STATES PATENT OFFICE.

FRANK BEVERLY, OF KILLEEN, TEXAS.

POWER-OPERATED SAW.

Application filed February 7, 1925, Serial No. 7,585. Renewed May 10, 1926.

This invention relates to a power operated saw and has for its principal object to provide a simple and efficient means whereby the motor of an automobile is utilized as a source of external power for operating the saw.

Another important object of the invention is to provide a power operated saw which may be readily and easily attached on an automobile, suitable bracing means being provided for supporting the saw frame and table.

A further object is to provide a power operated saw of the above mentioned character, which will save considerable time and labor and may be carried on an automobile without interfering with the usual operation thereof, thereby enabling the saw to be readily transported from place to place.

A further object is to provide a power operated saw of the above mentioned character, which is simple in construction, inexpensive, and furthermore adapted for the purposes for which the same is designated.

Other objects and advantages of this invention will become apparent during the course of the following description.

In the accompanying drawing forming a part of this specification and in which like numerals designate like parts throughout the same:

Figure 1 is a front elevation of an automobile showing my improved power operated saw mounted thereon.

Fig. 4 is a fragmentary detail of the drive shaft, showing the drive pulleys carried thereon and the clutch mechanism associated therewith.

Figure 2:
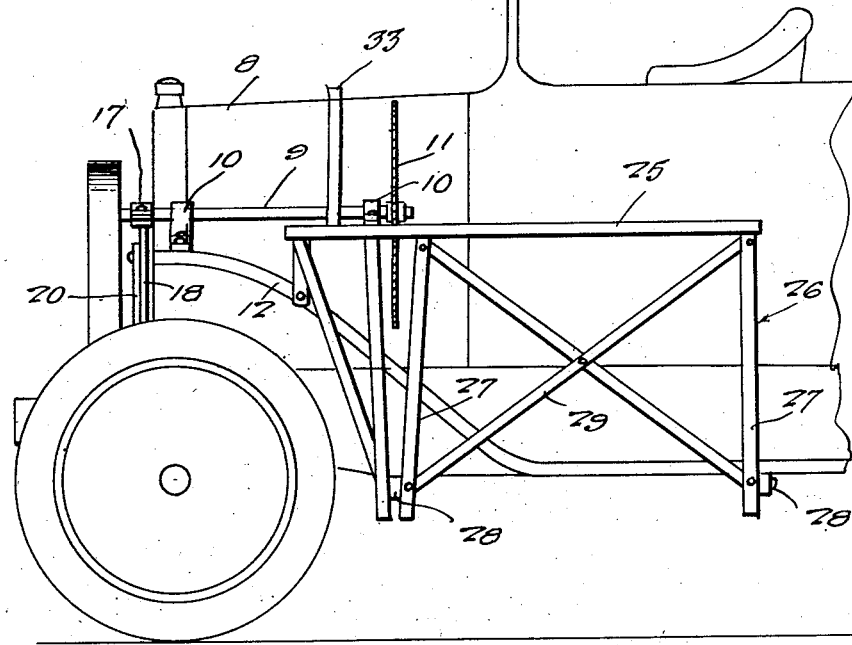
Fig. 2 is a side elevation.
Figure 3:
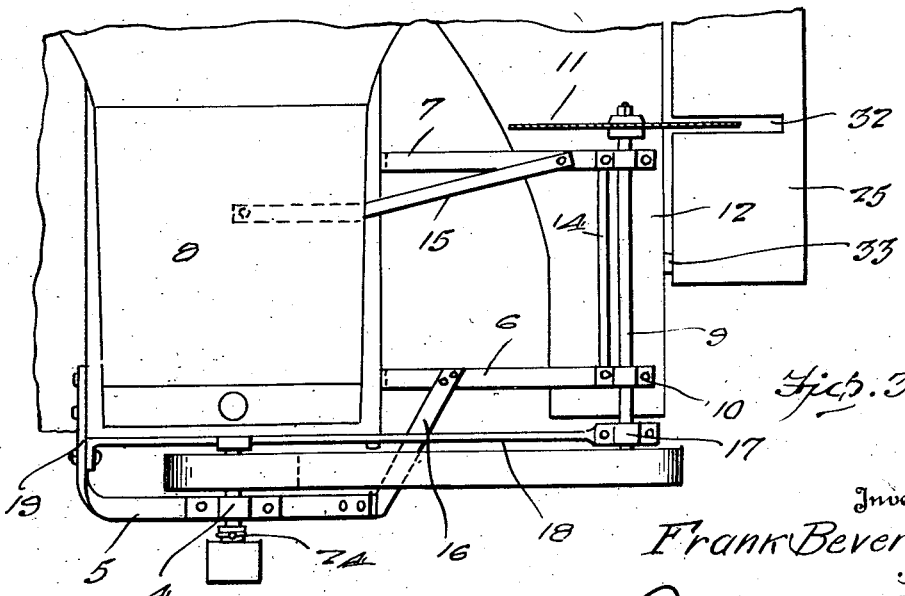
Fig. 3 is a top plan view.

In the drawings wherein for the purpose of illustration is shown the preferred embodiment of my invention, the numeral 1 designates the forward end of the crank shaft of an internal combustion engine preferably of the Ford type. A drive shaft 2 is connected to the forward end of the crank shaft by a coupling designated generally by the numeral 3. The drive shaft 2 extends forwardly from the front end of the automobile and is supported adjacent its outer end in a suitable bearing 4 provided on the supporting bracket 5, the latter being secured at its respective ends on the opposite sides of the hood of the automobile and further illustrated in Figs. 1 and 3 of the drawings.

A pair of parallel spaced arms 6 and 7 respectively are disposed on one side of the hood 8 of the automobile, the inner ends of said arms extending through suitable openings provided therefor in the fender apron and being secured to the side of the chassis as illustrated more clearly in Fig. 1.

The outer ends of the arms extend over the adjacent fender and provide a means for supporting the driven shaft 9 which extends transversely across the outer ends of the arms and is journaled in suitable bearings illustrated at 10. A circular saw blade 11 is secured on the rear end of the driven shaft 9 and supported on the outer end of the driven shaft which extends beyond the forward end of the fender 12 is the driven pulley 13. A cross-piece 14 extends between the parallel spaced arms adjacent the outer ends thereof as clearly illustrated in Fig. 3.

A brace 15 is secured at its outer end to the arm 7, the inner end of said brace extending inside of the hood and is secured on the top of the engine in any suitable manner. The bracket 5 is secured to the arm 6 by means of the connection 16. The outer end of the driven shaft 9 is further supported in a suitable bearing 17 carried by the outer end of an elongated bar 18 which extends across the forward end of the automobile, the inner end of the bar being secured to the laterally extending portion 19 of the bracket 5.

A vertical brace member 20 is provided for the intermediate portion of the bar 18 as more clearly illustrated in Fig. 1.

A drive pulley 21 is secured on the drive shaft 2 and trained over the alining pulleys 13 and 21 is the belt 22 which provides a means whereby the driven shaft and the circular saw blade carried on the rear end thereof will be rotated when the engine of the automobile is operated.

Loosely mounted on the outer end of the drive shaft 2 is the pulley 23 which may be utilized for actuating any other device having a pulley thereon. A clutch mechanism designated generally by the numeral 24 and of any conventional construction is associated with the forward end of the drive shaft 2 and said loosely mounted pulley 23 for locking the latter on said shaft whereby the same will rotate therewith.

The table for supporting the wood which is to be cut by the saw blade 11, is illustrated at 25. The supporting frame associated with the table is designated generally by the numeral 26 and the same includes the vertical standards 27, the upper ends of which are secured to the table, the lower ends of said standards being secured to the outer ends of the elongated supporting bars 28 which extend beneath the automobile and are secured to the frame thereof in any suitable detachable manner. Cross braces such as are shown at 29 are provided for the vertical standards 27. For the purpose of normally holding the table in a substantially level position as shown in Fig. 1, there is provided one or more expansible springs 30 co-operating with the lower ends of the standards and suitable blocks 31 associated with said supporting bars 28.

The transverse slot 32 accommodates the circular saw blade 11 and associated with the table on one side of the saw blade is the upstanding stop 33, against which the log is held as the table is urged toward the saw.

With the parts arranged as shown in the drawing, the motor of the automobile is utilized as a source of external power for operating the circular saw blade and a large quantity of wood may be cut in a comparatively short period without necessitating any manual labor. Furthermore the attachment of a saw on an automobile in the manner above described enables the same to be readily transported from place to place and will at all times be ready for use.

Furthermore the entire attachment may be removed from the automobile when it is not desired to use the same without materially altering any of the parts of the automobile. The attachment may furthermore be readily and easily secured in position on an automobile and will at all times be efficient in carrying out the purposes for which it is designated.

The forward end of the drive shaft is adapted to receive the usual starting crank whereby the internal combustion engine may be started by hand.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:—

1. In combination with an automobile including the crank shaft thereof, a front fender, and the chassis, of a drive shaft connected to said crank shaft and extending forwardly from the front end of the chassis, a bracket for supporting the outer end of said drive shaft mounted on the chassis, a pair of arms secured at their inner ends to one side of the chassis and extending over the fender, bracing means for said arm, a driven shaft journaled transversely in the outer ends of said arms, a circular saw carried by the driven shaft, pulleys carried by the forward ends of the drive and driven shafts, a belt extending over said pulleys whereby the driven shaft is actuated by the drive shaft when the crank shaft is in operation, and a wood supporting table rockably supported on the side of the automobile adjacent the fender and said circular saw blade.

2. In combination with an automobile including a chassis, a crank shaft, and a fender, of a drive shaft connected to said crank shaft and extending forwardly from the front end of the chassis, a bracket secured to the chassis for supporting the outer end of the drive shaft, a pair of arms secured at their inner ends to one side of the chassis, said arms extending over the fender, a driven shaft journaled transversely in the outer ends of said arms, a circular saw blade carried by said driven shaft, pulleys carried by the forward ends of said drive and driven shafts, a belt extending over said pulleys whereby the driven shaft is actuated by the drive shaft when the crank shaft is in operation, a pair of elongated supporting bars extending from beneath the automobile transversely of the driven shaft, a pair of standards pivoted to the bars, means bracing the standards, a table on the standards and provided with a slot for receiving the saw blade, and spring means for urging the table away from the saw blade.

In testimony whereof I affix my signature.

FRANK BEVERLY.